United States Patent [19]

Murray

[11] 4,023,293
[45] May 17, 1977

[54] CUSTOM FRAME ASSEMBLY

[76] Inventor: Margarethe M. Murray, 731 ½ Isabel St., Los Angeles, Calif. 90065

[22] Filed: May 26, 1976

[21] Appl. No.: 690,255

[52] U.S. Cl. .................................. 40/152; 403/401
[51] Int. Cl.² ........................................ G09F 1/12
[58] Field of Search ............ 40/152, 155; 403/402, 403/401; 52/758 H, 753 D

[56] References Cited

UNITED STATES PATENTS

| 2,581,843 | 1/1952 | Edwards | 40/155 |
| 3,698,114 | 10/1972 | Hirsch | 40/155 |
| 3,736,684 | 6/1973 | Grad | 52/753 D |
| 3,899,258 | 8/1975 | Mathews | 52/758 H X |

FOREIGN PATENTS OR APPLICATIONS 614,079  12/1959  Italy ..................................... 40/152

Primary Examiner—Louis G. Mancene
Assistant Examiner—Wenceslao J. Contreras

[57] ABSTRACT

A picture frame comprised of members to be joined at their 45° mitred ends into angular relation. Fastening means provided for the assembly are longitudinally extending passageways on one side of the frame members of triangular cross sectional construction and a plurality of interlock keys consisting of 2 legs joined at right angles being engaged with the passageways of adjacent frame members at their intersections.

2 Claims, 5 Drawing Figures

U.S. Patent    May 17, 1977    4,023,293
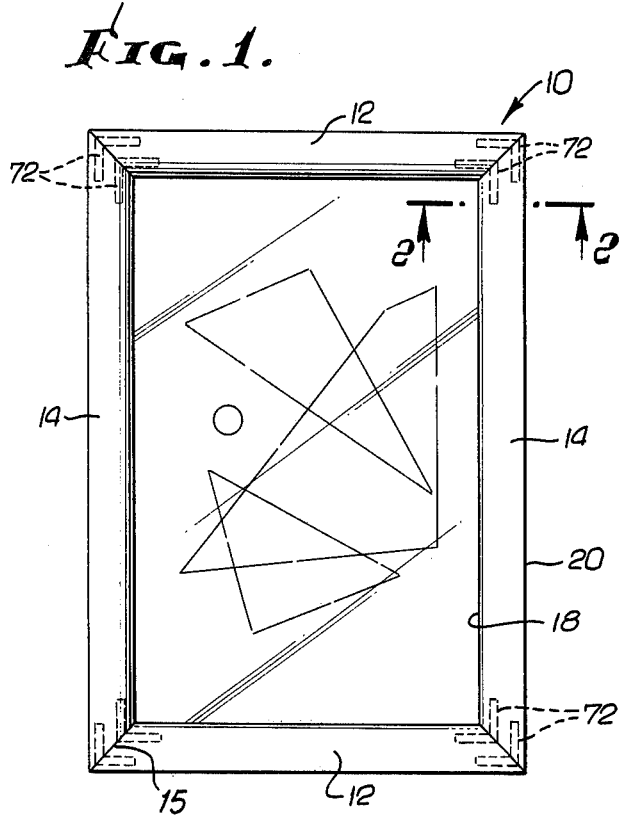
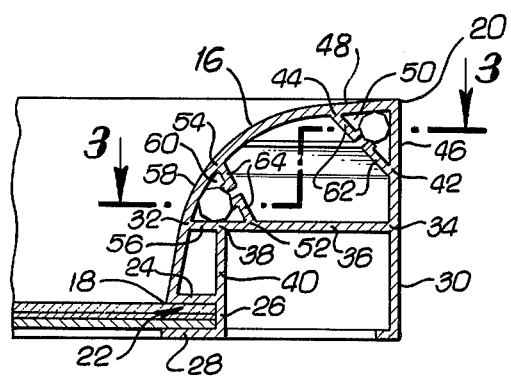
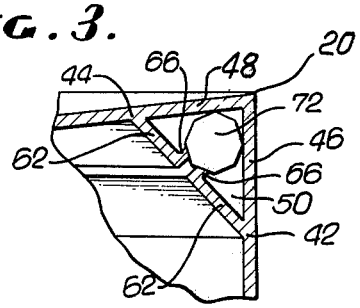
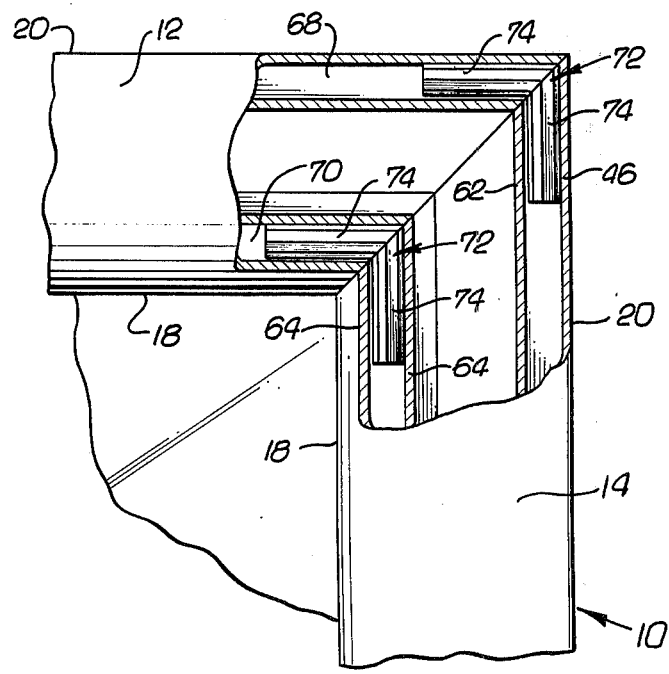
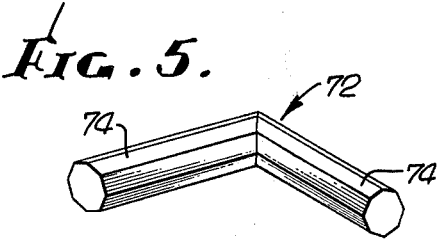

CUSTOM FRAME ASSEMBLY

BACKGROUND OF THE INVENTION

As is well known by those versed in the art kits of unassembled frame member lengths have been sold for some time. However, while combining certain advantageous features they are either relatively complicated in their assembly, necessitating a vise, glue and nails or screws, or others, due to construction, material and cost factors are somewhat limited in their application as to lengths of frame members and size of displays that could reasonably be framed by the use of such a system.

SUMMARY OF THE INVENTION

It is the object of this invention to introduce a kit which is equally easy to assemble, is applicable for a wide variety of dimensional displays and is of esthetic appeal and low cost. To this end it seems that certain thermoplastics, such as PVC or ABS, as the most adaptable, they are of low cost, easy to contour and color in various shades including, and possibly most appealing of all, a wood grain imitation.

A further object of the invention is, where frame and display dimensions demand, to utilize a multiple holding device based on the same principle at various cross sectional points at frame member intersections which can be applied separately or in conjunction thus alleviating excessive pressure at stress points.

These and other objects of the invention will be brought out in the following drawings and specifications representing the features of the invention in specific application within the scope of the appended claims.

BRIEF DESCRIPTION OF THE DRAWINGS

FIG. 1 is a front elevational view of a picture frame according to the invention in an assembled and operable condition;

FIG. 2 is a cross sectional view of a frame member taken along the lines 2—2 of FIG. 1;

FIG. 3 is a partial cross sectional view of a frame member as shown in FIG. 2;

FIG. 4 is a fragmentary and partial rear elevational view of the picture frame taken along the lines 4—4 of FIG. 2;

FIG. 5 is a perspective view of a fastening device or interlock key.

DESCRIPTION OF THE PREFERRED EMBODIMENT

A completed frame made in accordance with the present invention is illustrated in FIG. 1. Frame 10 consists of 4 lengths of frame members cut to appropriate lengths with the corners mitred at their intersections 15. As in the rectangular frame shown 2 frame members are longer 14 than the other pair 12.

As indicated in the cross section of a frame member 14 illustrated in FIG. 2 frame member walls are: a. the surrounds consisting of a front molding wall 16 which can be contoured and decorated in a variety of ways. This wall has 2 longitudinal edge portions, the inner edge portion 18 and the outer edge portion 20. Along the inner longitudinal edge portion 18 a picture rail is positional 22. Said picture rail is composed of the upper picture rail wall 24, the rear picture rail wall 26 and the lower picture rail wall 28. The upper picture rail wall 24 being in angular adjoinment with the front molding wall 16, the picture rail rear wall 26 and the picture rail lower wall 28 being again angularly connected to said upper picture rail wall and to one another in such a way as to form a groove adapted to receive a picture therein. Along the outer longitudinal edge portion 20 and extending rearwardly and away therefrom is the peripheral wall 30. b. the internal supporting walls At a point 32 on the rearwardly facing side of the front molding wall 16 and extending away from it to connect at a point 34 with the inwardly facing side of the peripheral wall 30 is a cross bracing wall 36 providing the cross brace between the two aforementioned walls of the surrounds. A perpendicular brace is provided by a perpendicular bracing wall 40 extending perpendicularly from the upper picture rail wall 24 in alignment with the rear picture rail wall 26, in the direction of and connecting with cross bracing wall 36 at a point 38.

The aforementioned walls as described under a. and b. are forming the frame member walls.

Again on the rearwardly facing side of a frame member 14 wall sections 62—62 and 64—64 are formed as an integral part of and diagonally extending from each of 2 adjoining frame member walls, for instance at points 42 and 44 extending off the peripheral wall 30 and front molding wall 16 respectively and in prosimity to their joining angle, or at points 52 and 54 extending off the cross bracing wall 36 and front molding wall 16 respectively and in proximity to their joining angle. Said wall sections 62—62 and 64—64 are diagonally projecting inwardly from points 42 – 44 and 52 – 54 proceeding in the direction of one another, thus forming the intermittent wall of a triangularly shaped enclosure; enclosure 50 consisting of peripheral wall portion 46, front molding wall portion 48 and wall sections 62—62, and enclosure 60 consisting of bracing wall portion 56, front molding wall portion 58 and wall sections 64—64. Said wall sections 62—62 and 64—64 while proceeding towards one another form feet 66 turning inwardly at their outer ends with respect to said triangular enclosures 50 and 60 to frictionally engage the corner fastening device or interlock key 72. Said triangular enclosures in their longitudinal extent form the passageways 68 and 70, FIG. 4, along the rearwardly facing side of a frame member being in alignment with corresponding passageways of joining frame members.

FIG. 3 is an enlarged cross sectional view of triangular enclosure 50 in engagement with an interlock key 72. The interlock key as shown in perspective in FIG. 5 consists of 2 legs 74 joined at right angles, each leg engaging the passageway of adjoining frame members. The interlock key as shown is preferably of a multifaceted cross sectional configuration.

FIG. 4 is a fragmentary partial rear elevational view of 2 frame member sections in angular alignment depicting the interlock key 72 in engagement with passageways 68 and 70 of 2 adjacent frame members 12 and 14 at their intersections.

As will be understood design considerations may result in slight variations of wall relations to each other. Such and other modifications are considered to be within the scope of the invention.

I claim:

1. A picture frame comprising:

45° end mitred frame members abutting on end to define a polygon, each frame member being composed of a front molding wall, a picture rail extending along the inner longitudinal edge of said front molding wall, a peripheral wall extending along the outer longitudinal edge of said front molding wall and one or a plurality of internal supporting walls, the foregoing forming the frame member walls, wall sections on the rearwardly facing side of said frame members diagonally extending from each of 2 adjoining frame member walls and forming an acute angle therewith, said wall sections proceeding from opposite ends toward one another forming the intermittent wall of a triangularly shaped enclosure consisting of 2 adjoining frame member wall portions and wall sections extending therefrom, said triangularly shaped enclosure constituting the cross sectional surrounds of a passageway longitudinally coextensive with a frame member and angularly aligning with passageways of joining frame members, a plurality of interlock keys consisting of 2 legs joined at right angles engaging the passageways of adjoining frame members at their intersections, locking the frame members into angular relation.

2. The invention according to claim 1 in which:

said wall sections at their outer ends turn inwardly with respect to said triangularly shaped enclosure forming feet to further frictionally engage the interlock key.

* * * * *